Feb. 28, 1928.

A. O. APPELBERG 1,661,103

THERMOSTATIC REGULATING DEVICE FOR HEAT PRODUCING APPARATUS

Filed Nov. 3, 1925

A. O. Appelberg

INVENTOR

By: Marks Clerk Atty

Patented Feb. 28, 1928.

1,661,103

UNITED STATES PATENT OFFICE.

AXEL OSVALD APPELBERG, OF STOCKHOLM, SWEDEN, ASSIGNOR TO AKTIEBOLAGET BIRKÄ REGULATOR, OF STOCKHOLM, SWEDEN, A COMPANY OF SWEDEN.

THERMOSTATIC REGULATING DEVICE FOR HEAT-PRODUCING APPARATUS.

Application filed November 3, 1925, Serial No. 66,615, and in Germany November 3, 1924.

In my pending application No. 724,173 filed July 3, 1924, I have suggested a method of regulating the supply of electrical energy to electrical heat producing apparatus by including in the main circuit of the heat producing apparatus a thermostatic make and break switch provided with a heating resistance the circuit of which is controlled by means of a rheostat, whereby the ratio between the make and break periods may be varied so as to increase or reduce respectively the amount of energy supplied to the heat producing apparatus. The present invention relates to improvements in a regulating device of this kind and essentially consists in a particular circuit arrangement having certain practical advantages. As contrasted with the arrangement described in said application where the rheostat is included in an independent circuit, the present invention is chiefly characterized by the heating winding of the thermostat and the rheostat being connected in parallel with one another and in series with the heat producing apparatus. In such an arrangement the heating winding of the thermostat will, evidently, be traversed by a relatively strong current. Said heating winding as well as the rheostat may therefore consist of very low electric resistances and, as a consequence, the regulating set may be made in a very simple and cheap form. As a further advantage afforded by this arrangement, the regulating set may be designed as a regulating unit adapted to be connected up directly in the main circuit much in the same way as an ordinary regulating series resistance, said regulating unit, however, working practically without energy losses, particularly in the case of using a highly sensitive thermostatic switch of the kind which is enclosed in an evacuated receptacle.

Figure 1:
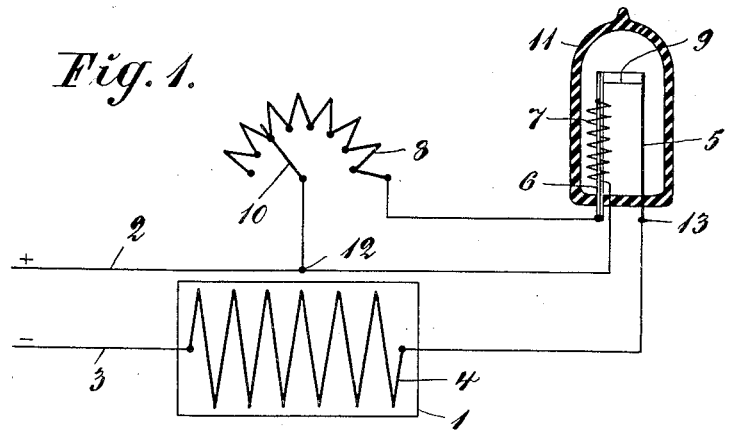
Figure 2:
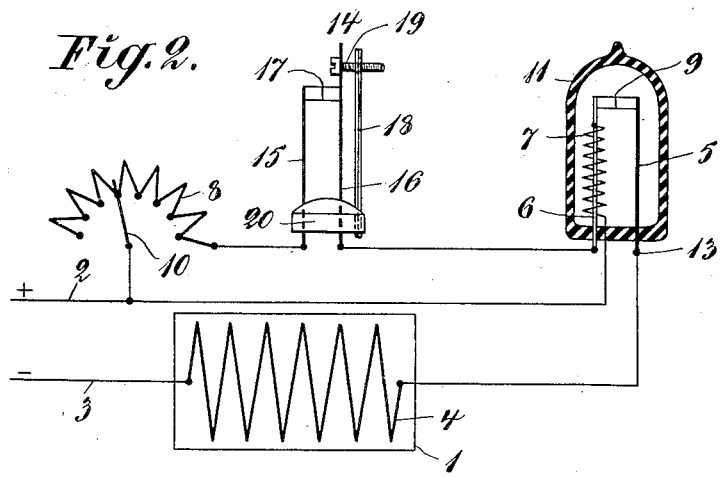

The invention will be more closely described with reference to the accompanying drawing on which Fig. 1 is a diagrammatical illustration of a regulating set according to this invention while Fig. 2 shows a modification thereof.

The electric apparatus 1 to be heated, which may be an electric cooking apparatus, a radiator or other heat-producing apparatus, is shown quite schematically, as its construction is of no importance to this invention. In Fig. 1 the main or consumption circuit consists of the leads 2, 3 of the supply main, the heater 4 of the heat producing apparatus 1 and the regulating set, all of said parts being connected up in series with one another. The regulating set is composed of the thermostatic switch 5, 6, the heating winding 7 thereof and the regulating resistance or rheostat 8, the winding 7 and the resistance 8 being connected in parallel with one another and in series with the switch. The make-and-break contact 9 of the switch is adapted to be operated by means of a bi-metallic stem 6 forming one of the two contact tongues 5, 6 of the switch, and its heating winding 7 which latter is connected at one end with the stem 6 and at the other end with the regulating lever 10 of the rheostat 8. The other terminal of the rheostat is connected up to the stem 6. The whole switch together with its heating winding is enclosed in a glass receptacle 11 which is evacuated or filled with an inert gas. The connecting point 12 forms one of the two terminals of the regulating set, while the other terminal of the set is formed by the fixed end 13 of the tongue or spring 5.

Upon closure of the main circuit 2, 12, 13, 4, 3, while the rheostat 8 is kept short-circuited, the heater 4 will, obviously, be supplied with uninterrupted current over the contact 9. However, if the regulating lever 10 is now set to the left so as to switch in a portion of the resistance 8 the heating winding will be supplied with current which may be sufficient to cause the bimetallic stem 6 to be deflected so as to open the contact 9. The thermostatic switch will then operate as an automatic make-and-break switch with a definite frequency provided the regulating lever 10 is maintained in the same position and, as a consequence of the repeated interruptions of the main circuit, the supply of energy to the heater 4 is reduced. If the regulating lever 10 is now set further to the left to insert more resistance in the shunt of the heating resistance 7, this will obviously cause a greater portion of the main current to pass through the latter in consequence of which the ratio of break period to make period will be increased, thus further reducing the supply of energy to the heater 4.

As set forth above, the invention affords the advantage that the consumption circuit may be controlled by means of a resistance which is exceedingly small relatively to the main resistance 4 and which may be made in an inexpensive and convenient form. It will be understood that the rheostat resistance 8 in this case need not necessarily be in the form of a winding, but may in many cases consist of a resistance rod. Further, the heating resistance 7 may, if desired, consist of a sheet metal strip insulated from the bimetallic stem 6 by means of a thin intermediate leaf of mica or the like.

If the resistance of the heater 4 should be reduced, while the regulating lever 10 of the rheostat is maintained in fixed position, the regulating set will produce the effect of preventing the supply of energy to the consumption apparatus from being increased. This action is a consequence of the fact that the increase of current will in turn cause the make-and-break frequency and the ratio between the break-and-make periods to be increased. Thus, in this respect the regulating set acts at the same time as a protecting device against overheating.

In order to utilize the invention more directly as an over-heating protecting device the rheostat 8 may be arranged so as to be automatically controlled by variations of temperature, for instance in such a manner that the regulating lever 10 is mechanically connected through the intermediary of a suitable gearing arrangement with a member adapted to be deflected by the influence of the fluctuations of temperature of the heat producing apparatus 1.

Another application of the regulating device for protecting purpose is shown in Fig. 2, according to which the branch circuit of the regulating resistance includes an auxiliary thermostatic switch 14 arranged in thermal relation with the heater 4 or with the substance to be heated.

The auxiliary switch 14 consists of two plate springs 15, 16 carrying the contact pieces of the switch contact 17, and a bimetallic stem 18 adapted to engage the free end of the spring 16 by means of the head of a set screw 19 extending through a hole in said spring and threaded into the end of the stem 18. The springs and the stem are secured to a suitable support 20 in such a manner that the switch contact 17 will be opened when the bimetallic stem 18 is heated to a certain temperature. By setting the screw 19 the switch may, evidently, be adjusted to open at different temperatures. When the heat producing apparatus or the substance to be heated respectively reaches a predetermined temperature, the auxiliary switch 14 will open the shunt circuit across the heating resistance 7 which, consequently, will be traversed by the whole of the main current, being thereby caused to reduce considerably the supply of energy to the heater 4 independently of the actual position of the regulating lever 10.

In this case the rheostat 8 may be utilized, in addition to its original object, for the purpose of adjusting exactly a constant temperature of the apparatus 1 or of the substance to be heated. To this end the supply of energy is adjusted by means of the rheostat in such a manner that the auxiliary switch 14 will be only just capable of interrupting the contact 17 thus making the make-and-break frequency low so that only small fluctuations of temperature may occur.

I claim:

1. A regulating device for heat producing apparatus comprising a thermostatic make and break switch included in the circuit of said apparatus so as to produce an intermittent supply of current, a heating resistance for said switch connected in series with the heat producing apparatus and with the make and break switch, an evacuated receptacle enclosing said make and break switch and its heating resistance, and a regulating resistance for regulating the supply of current to said heating resistance.

2. A regulating device as claimed in claim 1, in which the heating resistance of the thermostatic make and break switch and the regulating resistance form parallel branches of the circuit of the heat producing apparatus.

3. A regulating set for producing intermittent currents comprising a thermostatic make and break switch, a heating resistance for said switch, an evacuated receptacle enclosing the make and break switch and its heating resistance, and a regulating resistance for regulating the supply of current to said heating resistance to adjust the frequency of the intermittent current, said heating and regulating resistances being connected so as to form parallel branches of the intermittent current circuit.

4. In an electrical heat producing apparatus a heating circuit for said apparatus and means for regulating the supply of energy to said circuit comprising a thermostatic make and break switch included in said circuit, a heating resistance for said switch connected in series with the heat producing apparatus and with the make and break switch, an evacuated receptacle enclosing the make and break switch and its heating resistance, a regulating resistance for regulating the supply of current to said heating resistance and a thermostatic cut out arranged in thermal relation with the heat producing apparatus and adapted to cut off the regulating resistance at a certain temperature of said apparatus so as to increase the supply of current to the heating resistance of the make and break switch.

In testimony whereof I affix my signature.

AXEL OSVALD APPELBERG.